US011033941B2

(12) United States Patent
Hou et al.

(10) Patent No.: US 11,033,941 B2
(45) Date of Patent: Jun. 15, 2021

(54) SOIL-GROUNDWATER JOINT REMEDIATION DEVICE AND METHOD

(71) Applicant: Tsinghua University, Beijing (CN)

(72) Inventors: De-Yi Hou, Beijing (CN); Xiao-Yuan Cao, Beijing (CN); Guang-He Li, Beijing (CN); Xu Zhang, Beijing (CN); Fang Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 16/808,364

(22) Filed: Mar. 3, 2020

(65) Prior Publication Data

US 2020/0306808 A1    Oct. 1, 2020

(30) Foreign Application Priority Data

Mar. 26, 2019 (CN) .......................... 201910233330.8

(51) Int. Cl.
*B09C 1/00* (2006.01)
*B09C 1/06* (2006.01)
*B09C 1/08* (2006.01)

(52) U.S. Cl.
CPC .............. *B09C 1/005* (2013.01); *B09C 1/002* (2013.01); *B09C 1/06* (2013.01); *B09C 1/08* (2013.01); *B09C 2101/00* (2013.01)

(58) Field of Classification Search
CPC ....... B09C 1/002; B09C 1/08; B09C 2101/00; B09C 1/005; B09C 1/06; E21B 43/30
See application file for complete search history.

(56) References Cited

U.S. PATENT DOCUMENTS

| 5,855,775 | A | * | 1/1999 | Kerfoot | ............... B01F 3/04262 210/170.07 |
| 6,158,924 | A | * | 12/2000 | Athens | .................... B09C 1/002 166/268 |
| 6,210,073 | B1 | * | 4/2001 | Buehlman | ................. B09C 1/00 166/269 |
| 6,733,207 | B2 | * | 5/2004 | Liebert, Jr. | ............... B09C 1/00 175/70 |
| 7,175,770 | B2 | * | 2/2007 | Whisman, III | ......... B09C 1/002 166/264 |
| 7,326,002 | B2 | * | 2/2008 | Kerfoot | ..................... B09C 1/00 405/128.25 |
| 2004/0228689 | A1 | * | 11/2004 | Stegemeier | ............... E02D 3/11 405/128.35 |

(Continued)

*Primary Examiner* — Carib A Oquendo

(57) ABSTRACT

The disclosure provides a soil-groundwater joint remediation device and a method. The soil-groundwater joint remediation device is disposed in an area to be remediated and includes an injection structure, an extraction structure, and a control structure. The injection structure is disposed in an injection well defined in the area to be remediated. The injection structure includes a hot air injection member, an oxidant injection member, and a micro-bubble injection member. The extraction structure is disposed in an injection well defined in the area to be remediated and spaced from the injection structure. The extraction structure includes a liquid phase extraction member and a gas phase extraction member. The control structure controls the liquid phase extraction member and the gas phase extraction member to perform an extraction operation.

16 Claims, 5 Drawing Sheets

(56) References Cited

U.S. PATENT DOCUMENTS

| | | | | |
|---|---|---|---|---|
| 2005/0276662 | A1* | 12/2005 | Smith | B09C 1/06 405/128.2 |
| 2006/0016766 | A1* | 1/2006 | Kerfoot | B09C 1/10 210/760 |
| 2007/0154267 | A1* | 7/2007 | Bratton | B09C 1/005 405/128.1 |
| 2009/0304449 | A1* | 12/2009 | Kerfoot | B09C 1/00 405/52 |
| 2011/0293492 | A1* | 12/2011 | Gustafson | B09C 1/002 423/3 |
| 2015/0231674 | A1* | 8/2015 | Ellis | B09C 1/10 435/262.5 |

\* cited by examiner

SOIL-GROUNDWATER JOINT REMEDIATION DEVICE AND METHOD

CROSS-REFERENCE TO RELATED APPLICATIONS

This application claims all benefits accruing under 35 U.S.C. § 119 from China Patent Applications No. 201910233330.8, filed on Mar. 26, 2019 in the China National Intellectual Property Administration, the contents of which are hereby incorporated by reference in their entirety.

FIELD

The present disclosure relates to the field of soil and groundwater remediation, and particularly to soil-groundwater joint remediation devices and methods.

BACKGROUND

Soil and groundwater pollution is a serious problem that affects social development and must be addressed promptly.

In-situ remediation is commonly used to treat polluted soil and groundwater. The technology for the in-situ remediation of soil is relatively mature, but that for an in-situ remediation of both the soil and groundwater is still insufficient, as the in-situ remediation of soil and groundwater is a complex, slow and multi-faceted project.

Multiphase extraction is a method adopted in the current in-situ remediation. In the multiphase extraction, contaminated area is repeatedly flushed with clean air or clean water. The organic pollution in the soil and groundwater of the contaminated area is extracted out from underground with gas, groundwater, and oil, filtered and separated.

SUMMARY

What is needed therefore is to provide a device and a method for soil and groundwater joint remediation.

A soil-groundwater joint remediation device is disposed in an area to be remediated and includes an injection structure, an extraction structure, and a control structure.

In an embodiment, the injection structure is disposed in an injection well defined in the area to be remediated. The injection structure includes a hot air injection member, an oxidant injection member, and a micro-bubble injection member. The hot air injection member is configured for injecting hot air into the injection well. The oxidant injection member is configured for injecting an oxidant into the injection well. The micro-bubble injection member is configured for injecting micro-bubbles into the injection well.

In an embodiment, the extraction structure is disposed in an extraction well defined in the area to be remediated and spaced from the injection structure. The extraction structure includes a liquid phase extraction member and a gas phase extraction member. The liquid phase extraction member is configured for extracting liquid from the extraction well. The gas phase extraction member is configured for extracting gas from the extraction well.

In an embodiment, the control structure is respectively connected to the hot air injection member, the oxidant injection member, the micro-bubble injection member, the liquid phase extraction member, and the gas phase extraction member. The control structure controls the liquid phase extraction member and the gas phase extraction member to perform an extraction operation.

A method for joint treatment of soil and groundwater, including:

injecting hot air into the injection well by the hot air injection member, injecting oxidant into the injection well by the oxidant injection member, and injecting micro-bubbles into the injection well by the micro-bubble injection member, under the control of the control structure;

extracting groundwater from the extraction well in a pulsed manner by the liquid phase extraction member, under the control of the control structure; and extracting gas from the extraction well by the gas phase extraction member, under the control of the control structure.

BRIEF DESCRIPTION OF THE DRAWINGS

Implementations will now be described, by way of example only, with reference to the attached figures.

DETAILED DESCRIPTION

Figure 1:
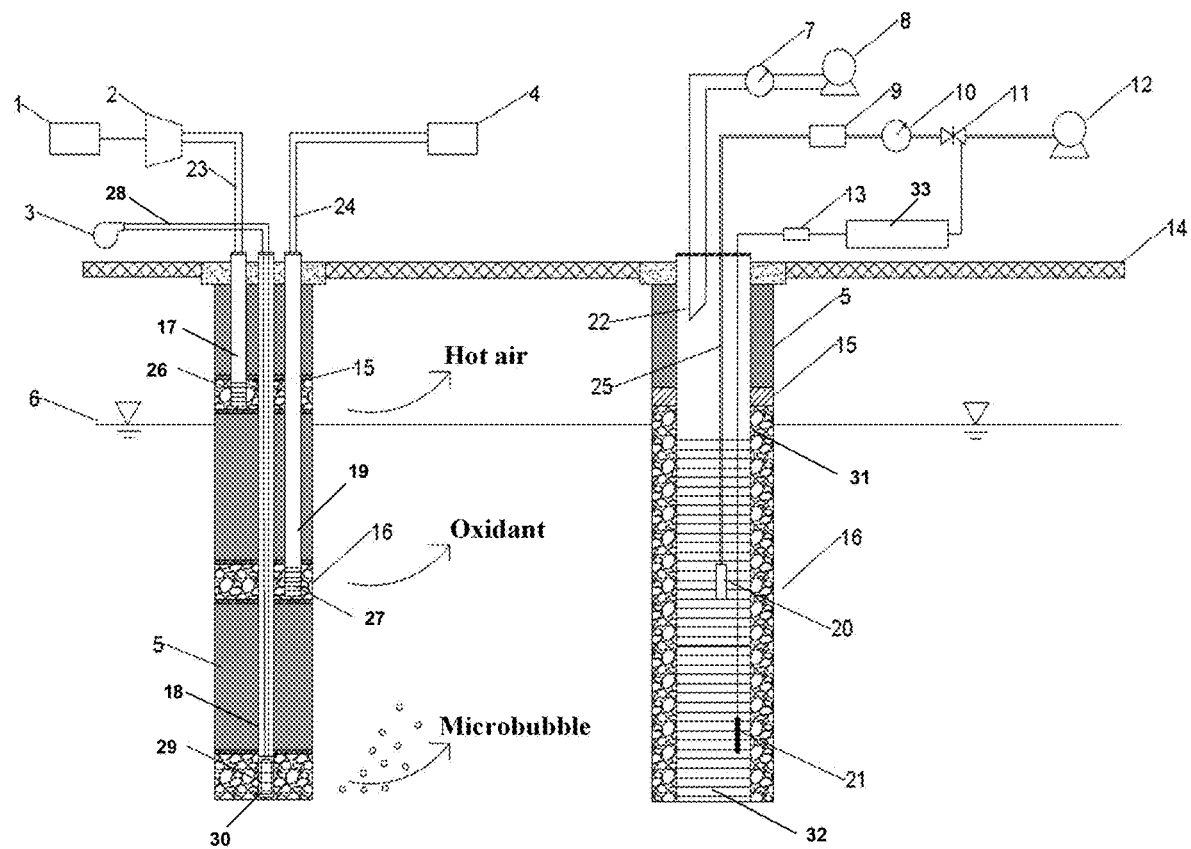
FIG. 1 is a schematic structural view of an embodiment of a soil-groundwater joint remediation device disposed in an area to be remediated.

In order to make the objectives, features and advantages of the present disclosure more comprehensible, the exemplified embodiments of the present disclosure will be illustrated in detail below with reference to the drawings. Many details are described in the following description, in order to understand the present disclosure thoroughly. However, the disclosure can be implemented in many other ways other than the ways described herein. Those skilled in the art can make some similar improvements without departing from the spirit of the present disclosure. Therefore, the present disclosure is not limited to the exemplified embodiments described below.

It should be noted that when an element is referred as being "arranged on" another element, it can be arranged directly on the other element, or an interposing element can be present. When an element is regarded as being "connected" to another element, it can be connected directly to the other element, or an interposing element can be present. The terms "vertical", "horizontal", "left", "right" and the like are used herein merely for the purpose of illustration, and are not the only implementation.

Referring to FIG. 1 to FIG. 4, the disclosure provides an embodiment of a soil-groundwater joint remediation device. The soil-groundwater joint remediation device can be disposed in the soil of the area to be remediated through an in-situ extraction.

The area to be remediated herein refers to a region where the soil and groundwater contain pollutants. The pollutants can include, but are not limited to, volatile organic compounds.

The soil-groundwater joint remediation device of the present disclosure can in-situ remove the pollutants in the contaminated area, and reduce water content of soil, to promote transfer of the volatile organic compounds from groundwater to soil, so that the volatile organic compounds can be extracted in the gas phase, which increases extraction efficiency, reduces energy consumption, saves cost and improves remediation efficiency.

In an embodiment, the soil-groundwater joint remediation device includes an injection structure and an extraction structure. At least two wells, an injection well and an extraction well, are defined in the area to be remediated. The injection structure is partially disposed in the injection well. The extraction structure is partially disposed in the extraction well. A preset space in the horizontal direction is defined between the extraction structure and the injection structure. The injection well and the extraction well are deep enough so that the bottoms thereof are both below the water table. The injection structure is capable of injecting gas and reagents for in-situ remediation into the injection well. The extraction structure is capable of extracting gas which may come from the injection well and liquid such as groundwater.

The injection structure includes a hot air injection member, an oxidant injection member, and a micro-bubble injection member, which are all partially disposed in the injection well. The hot air injection member is configured for injecting hot air into the injection well. The oxidant injection member is configured for injecting an oxidant into the injection well. The micro-bubble injection member is configured for injecting micro-bubbles into the injection well. The extraction structure includes a liquid phase extraction member and a gas phase extraction member, which are both partially disposed in the extraction well. The gas phase extraction member is configured for extracting gas from the extraction well. The liquid phase extraction member is configured for extracting liquid, such as groundwater, from the extraction well.

In an embodiment, the soil-groundwater joint remediation device further includes a control structure, which is respectively connected to the liquid phase extraction member and the gas phase extraction member, controlling the liquid phase extraction member and the gas phase extraction member to perform an extraction operation. In an embodiment, the control structure is configured to control the liquid phase extraction member extracting groundwater in a pulsed manner.

In an embodiment, the control structure is also respectively connected to the hot air injection member, the oxidant injection member, and the micro-bubble injection member. The control structure controls the hot air injection members to inject hot air into the injection well, and controls the oxidant injection member to inject oxidant into the injection well. The injected hot air is capable of permeating into soil around the injection well. The injected oxidant is capable of permeating into soil around the injection well and the groundwater. The injected hot air and oxidant increase the temperature and oxygen content of soil and groundwater, which promotes the volatilization and biodegradability of the pollutants in gas phase and liquid phase. Besides, the oxidant can chemically react with the pollutants thereby in-situ removing the pollutants to a certain extent.

In an embodiment, the control structure is further connected to the micro-bubble injection member, and controls the micro-bubble injection member to inject micro-bubbles into the injection well. The micro-bubbles are capable of permeating into soil around the injection well. The movement of micro-bubbles in the contaminated groundwater can be utilized to promote an inter-phase mass transfer of pollutants from groundwater to soil.

The control structure controls the liquid extraction member to extract liquid, such as groundwater, from the extraction well, and controls the gas phase extraction member to extract gas from the extraction well. By extracting groundwater, the surface 6 of the groundwater, also known as the water table, will decrease, and the water content of the upper soil layer will be reduced. Thus, the volatile organic compounds will be transferred from the groundwater to the soil, and finally be extracted in gas phase, which can improve the extraction efficiency. The liquid phase extraction member and the gas phase extraction member can directly extract volatile organic compounds in two different forms, a gas phase and a liquid phase, and significantly reduce the subsequent processing load.

In an embodiment, the control structure is configured to control the liquid phase extraction member to extract groundwater in a pulsed manner. That is to say, when the level of groundwater drops from a first height to a second height, the control structure controls the liquid phase extraction member to stop the extraction operation. When the level of groundwater increases from the second height to the first height, the control structure controls the liquid phase extraction member to start to perform the extraction operation. The control structure controls a pump to extract groundwater according to the level of groundwater to form a pulsed pumping, so that the water content of soil can be reduced, and the volatile organic compounds can be greatly transferred from the groundwater to the soil, and then extracted in gas phase, which can significantly improve the extraction efficiency and reduce the labor cost.

The soil-groundwater joint remediation device of the present disclosure is based on molecular dynamics, thermodynamics and water chemistry, and extracts organic pollutants in soil and groundwater by coupling various remediation techniques, which effectively solves the problem of low extraction efficiency and high cost in the current multi-phase extraction, reduces energy consumption and labor cost, and significantly improves the remediation efficiency. In an embodiment, the pulsed manner of the liquid phase extraction greatly reduces the labor cost of the extraction, and improves the extraction efficiency.

Figure 4:
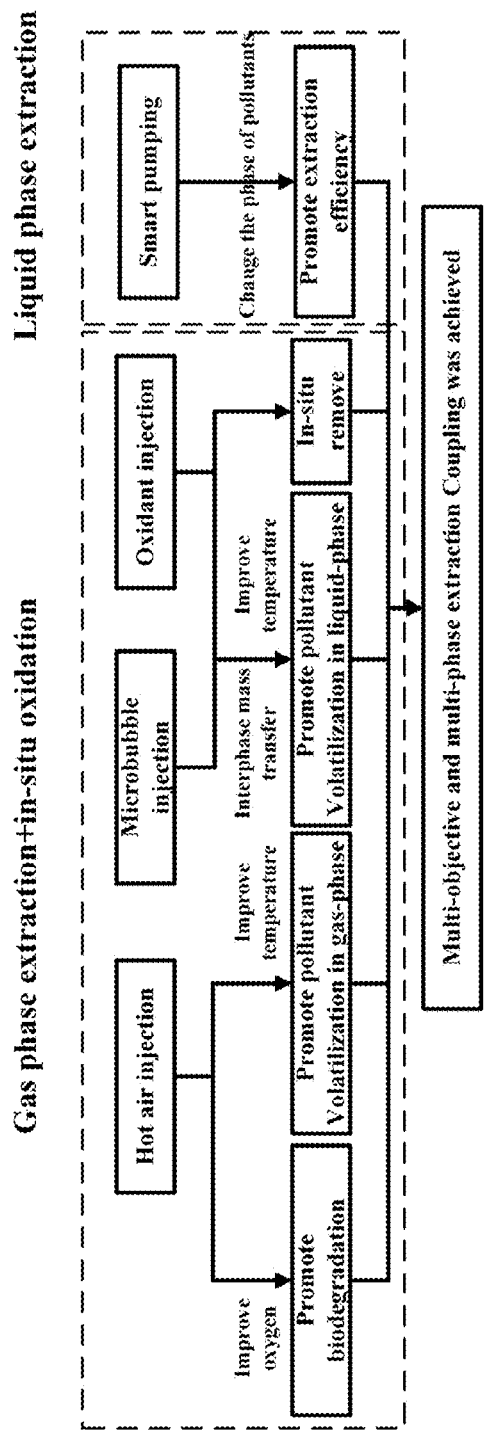
FIG. 4 is a schematic diagram of an operation process of an embodiment of the soil-groundwater joint remediation device.

Referring to FIG. 1 and FIG. 4, in an embodiment, the hot air injection member includes a power source 1, a hot air compressor 2, a hot air injection pipe 23, a hot air injection well member 17, and a hot air injection screen 26.

The hot air compressor 2 is connected to the power source 1. The hot air injection pipe 23 is connected to and fluid communicated with the hot air compressor 2 at one end, and connected to and fluid communicated with the hot air injection well member 17 at the other end. The hot air injection well member 17 is a tubular member including a first end and a second end opposite to the first end. The second end of the hot air injection well member 17 extends into the injection well. The hot air injection screen 26 can be a mesh, a sieve, or a perforated member, disposed at the second end of the hot air injection well member 17. In an embodiment, the end of the hot air injection pipe 23 extends into the hot air injection well member 17. The power source 1 controls the hot air compressor 2 to generate hot air. The hot air is injected into the hot air injection well member 17 through the hot air injection pipe 23, directed to the injection well through the hot air injection screen 26, and permeates to soil around the hot air injection screen 26.

In an embodiment, the first end of the hot air injection well member 17 exposes out from the injection well, and the rest is located in the injection well.

In an embodiment, a section of the injection well around the hot air injection screen 26 is filled with gravel to form a gravel layer 16, and sections of the injection well around the hot air injection well member 17 and below the bottom of the hot air injection screen 26 are filled with grout to form cement layers 5. In an embodiment, sections of the injection well above and below the gravel layer 16 adjacent to the hot air injection screen 26 are also filled with bentonite to form bentonite layers 15. In an embodiment, a thickness of the bentonite layer 15 is about 20 centimeters (cm) to about 30 cm. That is to say, in this embodiment, the hot air injection screen 26 is mainly surrounded by the gravel layer 16 sandwiched by two bentonite layers 15 with a thickness of about 20 cm to about 30 cm.

The hot air injection screen 26 can be in a tubular structure with a length of about 0.5 meters (m) to about 1 m. The bottom of the hot air injection screen 26 is located above the surface 6 of groundwater. A distance from the bottom of the hot air injection screen 26 to the surface 6 of groundwater is about 0.5 m to about 1 m. The hot air injection screen 26 has openings for penetration of hot air. The length of the hot air injection screen 26 is determined according to the parameters of the hydrogeological conditions of the area to be remediated and the amount of hot air to be injected. Moreover, the depth of the second end of the hot air injection well member 17 is determined according to the hydrogeological conditions of the area to be remediated. The hot air injection well member 17 can be integrated with the hot air injection screen 26. In an embodiment, the second end of the hot air injection well member 17 with a mesh structure can be used as the hot air injection screen 26 to communicate with the surrounding area. In another embodiment, the hot air injection screen 26 and the hot air injection well member 17 are two members securely attached to each other.

In one embodiment, the hot air compressor 2 is disposed above the ground of the area to be remediated. The first end of the hot air injection well member 17 protrudes from the ground for about 0.05 m to about 0.1 m. In an embodiment, the hot air injection member also includes a hot air sealing cover that is disposed on the first end of the hot air injection well member 17, prevents leakage of hot air from the hot air injection well member 17 and prevents volatile organic compounds from flowing out from the hot air injection well member 17.

By injecting hot air into the unsaturated zone of soil to be remediated, the temperature of the soil layer can be increased to promote the volatilization of volatile organic compounds in soil. In addition, by appropriately adding some heat to the soil layer, the temperature of soil is controlled between about 20° C. and about 37° C., which is beneficial to the biodegradation of volatile organic compounds in soil.

In an embodiment, the oxidant injection member includes an oxidant tank 4, an oxidant injection pipe 24 connected to the oxidant tank 4, an oxidant injection well member 19, and an oxidant injection screen 27.

The oxidant injection pipe 24 is connected to and in fluid communication with the oxidant tank 4 at one end, and connected to and in fluid communication with the oxidant injection well member 19 at the other end. The oxidant injection well member 19 is a tubular member including a first end and a second end opposite to the first end. The second end of the oxidant injection well member 19 extends into the injection well. The oxidant injection screen 27 can be a mesh, a sieve, or a perforated member, disposed at the second end, a lower end, of the oxidant injection well member 19. In an embodiment, the oxidant injection pipe 24 extends into the oxidant injection well member 19. The oxidant in the oxidant tank 4 is injected into the oxidant injection well member 19 through the oxidant injection pipe 24, delivered to the injection well through the oxidant injection screen 27, and permeates to soil around the oxidant injection screen 27. In an embodiment, the oxidant injection pipe 24 is made of unplasticized polyvinyl chloride (UPVC).

The oxidant such as Fenton reagent is stored in the oxidant tank 4. The amount of the oxidant stored in the oxidant tank 4 can satisfy the needs for reacting with a total amount of pollutants around the injection well in a radius of about 10 m to about 20 m. In an embodiment, the first end of the oxidant injection well member 19 is exposed out from the injection well, and the rest is located in the injection well.

In an embodiment, a section of the injection well around the oxidant injection screen 27 is filled with gravel to form a gravel layer 16, and sections of the injection well around the oxidant injection well member 19, and below the bottom of the oxidant injection screen 27 are filled with grout to form cement layers 5. In an embodiment, sections of the injection well above and below the gravel layer 16 adjacent to the oxidant injection screen 27 are also filled with bentonite to form bentonite layers 15. In an embodiment, a thickness of the bentonite layer 15 is about 20 cm to about 30 cm. That is to say, in this embodiment, the oxidant injection screen 27 is mainly surrounded by the gravel layer 16 sandwiched by two bentonite layers 15 with a thickness of about 20 cm to about 30 cm.

The oxidant injection screen 27 can be in a tubular structure with a length of about 0.5 m to about 1 m. The bottom of the oxidant injection screen 27 is located below the surface 6 of groundwater. A distance from the bottom of the oxidant injection screen 27 to the surface 6 of groundwater is about 1 m to about 2 m. The oxidant injection screen 27 has openings for permeation of the oxidant. The length of the oxidant injection screen 27 is determined according to the parameters of the hydrogeological conditions of the area to be remediated and the amount of oxidant to be injected. Moreover, the depth of the second end of the oxidant injection well member 19 is determined according to the hydrogeological conditions of the area to be remediated. The oxidant injection well member 19 can be integrated with the oxidant injection screen 27. In an embodiment, the second end of the oxidant injection well member 19 with a mesh structure can be used as the oxidant injection screen 27 to communicate with the surrounding area. In another embodiment, the oxidant injection screen 27 and the oxidant injection well 19 are two members and securely attached to each other.

In one embodiment, the oxidant tank 4 is disposed above the ground of the area to be remediated. The first end of the oxidant injection well member 19 protrudes from the ground for about 0.05 m to about 0.1 m. In an embodiment, the injection oxidant member also includes an oxidant sealing cover that is disposed on the first end of the oxidant injection well member 17, which prevents leakage of the oxidant and avoids the outflow of volatile organic compounds from the oxidant injection well member 19.

By injecting oxidant into the phreatic zone, also known as the saturation zone, of soil in the area to be remediated, the oxidant, such as the Fenton reagent, in-situ oxidizes volatile organic compounds in groundwater, generates a large amount of heat in the chemical reaction, and promotes the volatilization of the organic pollutants in groundwater. Meanwhile, the hot air injected to soil drives the volatile organic compounds in soil layer to be extracted in the gas phase, to realize the in-situ remediation of volatile organic compounds in groundwater.

In an embodiment, the micro-bubble injection member includes a blower 3, a flow conduit 28, a micro-bubble generator 29, a micro-bubble injection well member 18, and a micro-bubble injection screen 30.

The flow conduit 28 is connected to and fluid communicated with the blower 3 at one end, and connected to and fluid communicated with the micro-bubble generator 29 at the other end. The micro-bubble injection well member 18 is a tubular member including a first end and a second end opposite to the first end. The second end of the micro-bubble injection well member 18 extends into the injection well. The micro-bubble injection screen 30 can be a mesh, a sieve, or a perforated member, disposed at the second end of the micro-bubble injection well member 18. The micro-bubble generator 29 is located in and at the bottom of the micro-bubble injection well member 18 corresponding to the micro-bubble injection screen 30. Wind flow generated by the blower 3 is directed to the micro-bubble generator 29 through the flow conduit 28. Micro-bubbles are generated by the micro-bubble generator 29, injected into the injection well through the micro-bubble injection screen 30, and permeate to soil around the micro-bubble injection screen 30.

The blower 3 is configured for generating wind flow. The end of the flow conduit 28 extends into the micro-bubble injection well member 18 and is connected to the micro-bubble generator 29.

In an embodiment, a section of the injection well around the micro-bubble injection screen 30 is filled with gravel to form a gravel layer 16, and a section of the injection well around the micro-bubble injection well member 18 is filled with grout to form cement layers 5. In an embodiment, sections of the injection well above and below the gravel layer 16 adjacent to the micro-bubble injection screen 30 are also filled with bentonite to form bentonite layers 15. In an embodiment, a thickness of the bentonite layer 15 is about 20 cm to about 30 cm. That is to say, the micro-bubble injection screen 30 is mainly surrounded by the gravel layer 16 sandwiched by two bentonite layers 15 with a thickness of about 20 cm to about 30 cm.

The micro-bubble injection screen 30 can be in a tubular structure with a length of about 0.5 m to about 1 m. The bottom of the micro-bubble injection screen 30 is located below the surface 6 of groundwater. The micro-bubble injection screen 30 is located at the bottom of the injection well to reach the deepest point of soil in the area to be remediated. The micro-bubble injection screen 30 has openings for penetration of the micro-bubbles. The length of the micro-bubble injection screen 30 is determined according to the parameters of the hydrogeological conditions of the area to be remediated and the amount of micro-bubbles to be injected. Moreover, the depth of the second end of the micro-bubble injection well member 18 is determined by the hydrogeological conditions of the area to be remediated. The micro-bubble injection well member 18 can be integrated with the micro-bubble injection screen 30. In an embodiment, the second end of the micro-bubble injection well member 18 with a mesh structure can be used as the micro-bubble injection screen 30 to communicate with the surrounding area. In another embodiment, the micro-bubble injection screen 30 and the micro-bubble injection well member 18 are two members and securely attached with each other.

In one embodiment, the blower 3 is disposed above the ground of the area to be remediated. The first end of the micro-bubble injection well member 18 protrudes from the ground for about 0.05 m to about 0.1 m. In an embodiment, the micro-bubble injection member includes a micro-bubble sealing cover that is disposed on the first end of the micro-bubble injection well member 18, which prevents leakage of the micro-bubbles injected into the micro-bubble injection well member 18, and avoids the outflow of volatile organic compounds from the micro-bubble injection well member 18.

By injecting micro-bubbles into the deepest soil layer at the bottom of the saturation zone in the area to be remediated, organic pollutants in the deep groundwater can be adsorbed on the surface of the micro-bubbles and slowly rise with the micro-bubbles to reach the upper side of the saturation zone or the border between the saturation zone and the unsaturated zone. Through the inter-phase mass transfer, the micro-bubbles transfer from the deep groundwater to the shallow soil layer, to promote the rapid rising of pollutants and effective extraction of the pollutants in the form of a gas phase.

In an embodiment, the extraction structure includes the gas phase extraction member, the liquid phase extraction member, an extraction well member 31, and an extraction screen 32.

The gas phase extraction member includes an air suction pump 8 and an air suction pipe 22. The air suction pump 8 is disposed above the ground of the area to be remediated.

The air suction pipe 22 is connected to and fluid communicated with the air suction pump 8 at one end, and in fluid communication with the extraction well member 31 at the other end. In an embodiment, the end of the air suction pipe 22 extends into the extraction well member 31. The extraction well member 31 is a tubular member including a first end and a second end opposite to the first end. The second end of the extraction well member 31 extends into the extraction well. The extraction screen 32 can be a mesh, a sieve, or a perforated member, disposed at the second end of the extraction well member 31. The extraction screen 32 can be a tubular mesh structure extending from the surface 6 of groundwater to the bottom of the extraction well. The lower end of the air suction pipe 22 extending into the extraction well member 31 is located between the ground and the surface 6 of the groundwater to extract gas in the extraction well member 31. The distance between the lower end of the air suction pipe 22 and the ground is about 0.5 m to about 1 m.

The extraction screen 32 has openings for penetration of gas. The length of the extraction screen 32 depends on the parameters of the hydrogeological conditions of the area to be remediated. In an embodiment, a section of the extraction well around the extraction screen 32 is filled with gravel to form a gravel layer 16, and a section of the extraction well around the extraction well member 31 is filled with grout to form a cement layer 5. In an embodiment, a section of the extraction well between the gravel 16 and the cement layer 5 is filled with bentonite to form a bentonite layer 15. In an embodiment, a thickness of the bentonite layer 15 is about 20 cm to about 30 cm. The gravel layer 16 extends out from the surface 6 of groundwater so that hot air can transfer above groundwater from soil to the extraction well member 31 through the extraction screen 32. The top of the gravel layer 16 is located above the surface 6 of the groundwater.

The diameter of the air suction pipe 22 can be determined according to the hydrogeological conditions of the area to be remediated. The extraction well member 31 can be integrated with the extraction screen 32. In an embodiment, the second end of the extraction well member 31 with a mesh structure can be used as the extraction screen 32 to communicate with the surrounding area. In another embodiment, the extraction screen 32 and the extraction well member 31 are two members securely attached to each other.

Under the diving of the air suction pump 8, gas in soil can be extracted into the extraction well member 31 through the extraction screen 32, expelled out through the air suction pipe 22, and then enter a post-treatment device through a branch pipe connected to the air suction pipe 22. The gas with volatile organic compounds is then treated by the post-treatment device.

In an embodiment, the liquid phase extraction member includes a water suction pump 12 and a water suction pipe 25. The water suction pump 12 is disposed above the ground of the area to be remediated. The water suction pipe 25 is connected to and in fluid communication with the water suction pump 12 at one end, and connected to and in fluid communication with the extraction well member 31 at the other end. In an embodiment, the lower end of the water suction pipe 25 extends into the extraction well member 31, and has a pump head 20 attached thereto. The pump head 20 is vertically disposed in the extraction well member 31 and is located about 5 m to about 6 m below the surface 6 of the groundwater.

The diameter of the water suction pipe 25 is determined according to the hydrogeological conditions of the area to be remediated. In an embodiment, the diameter of the water suction pipe 25 is about 1 cm to about 2 cm.

Under the diving of the water suction pump 12, groundwater in soil can extracted into the extraction well member 31 through the extraction screen 32, expelled out through the water suction pipe 25, and then introduced into a post-processing device through a branch pipe connected to the water suction pipe 25. The groundwater with volatile organic compounds is then treated by the post-processing device. In an embodiment, both the air suction pipe 22 and the water suction pipe 25 are made of UPVC.

In an embodiment, the extraction structure further includes a sealing cover that is disposed on the first end of the extraction well member 31, preventing leakage of volatile organic compounds. The first end of the extraction well member 31 protruded from the ground of the area to be remediated by about 0.05 m to about 0.1 m.

In an embodiment, the control structure includes a controller 33, a control switch 11, a data converter 13, and a level gauge 21.

The level gauge 21 is located below the surface 6 of the groundwater for a distance of about 10 m to about 15 m in the extraction well member 31, and is configured to detect the water level change of groundwater in the extraction well member 31. The data converter 13 is connected to the controller 33 and the level gauge 21. The water level change data detected by the level gauge 21 is transmitted to the controller 33 through the data converter 13. The control switch 11 is disposed on the water suction pipe 25 and is connected to the controller 33. The controller 33 controls the on and off of the control switch 11 according to the water level change of groundwater.

In an embodiment, the controller 33 is a PLC controller. The control switch 11 is configured to control the opening and close of the water suction pipe 25. The controller 33 is respectively and electrically connected to the data converter 13 and the control switch 11. The level gauge 21 is electrically connected to the data converter 13. In an embodiment, the level gauge 21 and the pump head 20 are spaced from each other for a distance to prevent mutual interference.

In an embodiment of a pulsed extraction performed by the liquid phase extraction member, the liquid phase extraction member is controlled by the controller 33 and the control switch 11 to extract groundwater from the extraction well. At this time, the surface 6 of groundwater is continuously decreased. As groundwater continuously enters the extraction well member 31 during the extraction of groundwater, equilibrium of the surface 6 of groundwater will be formed. When the change of the surface 6 within a time period of $t_1$ does not exceed $\Delta h$, it can be determined that the surface 6 of groundwater is in an equilibrium state. After the surface 6 of groundwater has stabilized, the liquid phase extraction member continues to operate for a time period of $t_2$; and then, the control switch 11 is off, and the liquid phase extraction member stops working, at which time the surface 6 of groundwater gradually increases. After a time period of $t_3$, the surface 6 of groundwater is recovered to a certain extent, and the control switch 11 is turned on again to control the liquid phase extraction member to extract groundwater again. In such pulsed manner, the liquid phase extraction member intermittently extracts groundwater from the extraction well, and the surface 6 of groundwater intermittently decreases and increases to transfer the pollutants from groundwater to soil thereby transforming the liquid phase pollutants into the gas phase pollutants.

Figure 2:
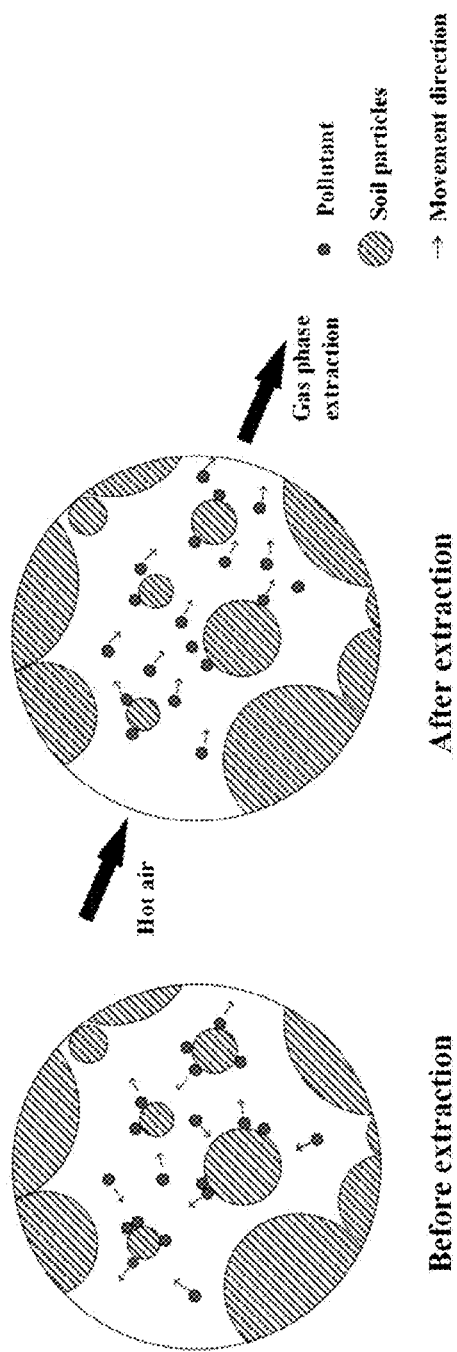
FIG. 2 is a schematic view showing an extraction process before and after injecting hot air to the soil by an embodiment of the soil-groundwater joint remediation device.
Figure 3:
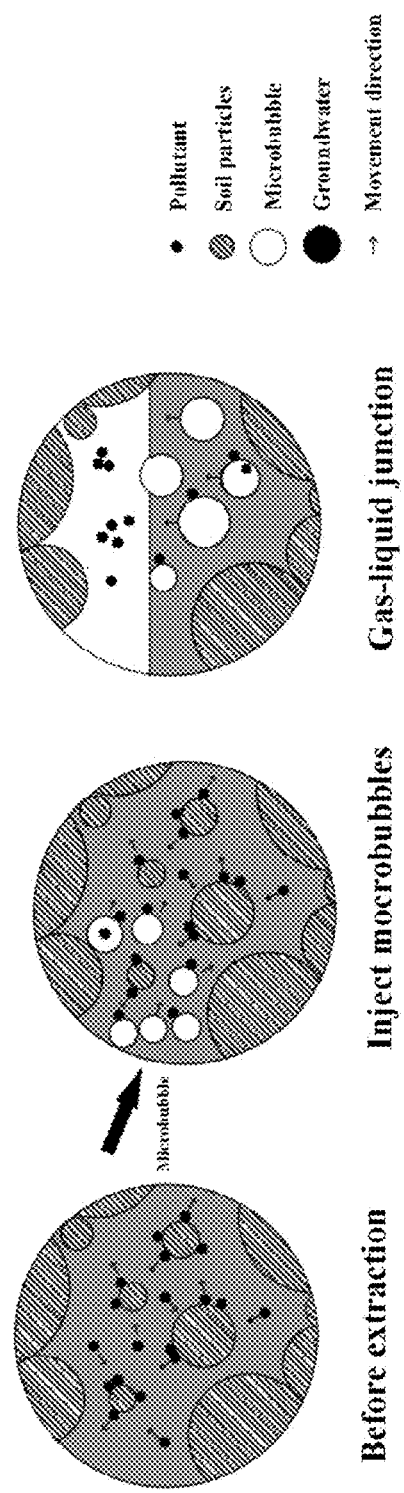
FIG. 3 is a schematic view showing an extraction process before and after injecting micro-bubbles to the soil by an embodiment of the soil-groundwater joint remediation device.

Referring to FIG. 2, hot air flows through micropores in soil and carries the gas phase organic pollutants to the flow direction from the hot air injection well member 17 to the extraction well member 31; and finally the gas phase pollutants are extracted from the extraction well member 31 by the air suction pump 8. Referring to FIG. 3, micro-bubbles injected into groundwater by the micro-bubble injection member adsorb the organic pollutants in liquid phase and carries the organic pollutants from groundwater to air, thereby completing an inter-phase mass transfer of the pollutants; the organic pollutants in groundwater are transformed into gas phase and then finally extracted from the extraction well member 31 by the air suction pump 8. Meanwhile, the polluted groundwater is also extracted out by the liquid phase extraction member.

Accordingly, the soil-groundwater joint remediation device of the present disclosure can in-situ remove the pollutants in the contaminated area, and reduce water content of soil, to promote transfer of the volatile organic compounds from groundwater to soil, so that the volatile organic compounds can be extracted in gas phase, which increases extraction efficiency, reduces energy consumption, saves cost and improves remediation efficiency.

The controller 33 controls the operation of the extraction of groundwater according to the change of the surface 6 of groundwater. The decrease of the surface 6 of groundwater will reduce the water content of soil to promote transfer of the volatile organic compounds from groundwater to soil, so that more volatile organic compounds can be exposed in the micropores of soil and transformed to gas phase. The gas phase pollutants are much easier to be extracted and purified. The transfer of the pollutants from liquid phase to gas phase reduces the content of the pollutants in groundwater, so that the extracted groundwater can be purified more efficiently in a more cost-effective manner.

In an embodiment, the gas phase extraction member further includes a gas phase pressure gauge 7, and the liquid phase extraction member includes a liquid phase pressure gauge 10 and a flow gauge 9. The gas phase pressure gauge 7 is disposed in the gas suction pipe 22 for measuring the change of the gas phase pressure during the extraction of gas. The liquid phase pressure gauge 10 is disposed in the water suction pipe 25 for measuring the change of the liquid phase pressure during the extraction of groundwater. The measure range of the gas phase pressure gauge 7 and the liquid phase pressure gauge 10 at least meet an extraction influence radius. In an embodiment, the extraction influence radius ranges from about 5 m to about 15 m. The flow gauge 9 is disposed in the water suction pipe 25 for measuring the flow rate in the groundwater extraction. The measure range of the flow gauge 9 can be in a range from about 0.1 m$^3$/h to about 10 m$^3$/h.

In an embodiment, the soil-groundwater joint remediation device further includes an anti-penetration member 14 disposed on the ground of the area to be remediated. The anti-penetration member 14 is configured to prevent substance exchange between above ground and underground. In an embodiment, the anti-penetration member 14 can be a barrier film or a barrier coating.

Figure 5:
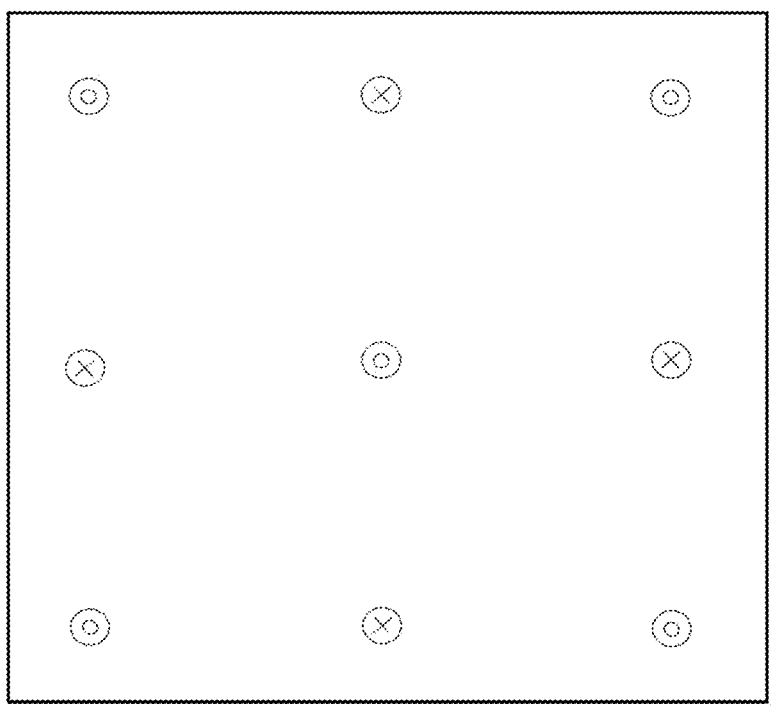
FIG. 5 is a schematic top view of an embodiment of the soil-groundwater joint remediation device.

In an embodiment, referring to FIG. 5, a plurality of injection wells and a plurality of extraction wells can be defined in the area to be remediated. The soil-groundwater joint remediation device can include a plurality of the injection structures and a plurality of the extraction structures corresponding to the injection wells and the extraction wells arranged in rows and/or columns to form an array. Each two adjacent extraction structures are separated by one injection structure located therebetween. Each two adjacent injection structures are separated by one extraction structure located therebetween. The adjacent extraction and injection structures are equally spaced, such as in a range from about 5 m to about 20 m. The space between the injection structure and the extraction structure can be determined according to the hydrogeological conditions of the area to be remediated.

In operation of the soil-groundwater joint remediation device, hot air is injected into soil to promote the volatilization of volatile organic compounds in the soil and the degradation of the organic pollutants. The oxidant is injected into the shallower side of the saturation zone of soil to in-situ react with the volatile organic compounds, which will generate heat to promote the migration of the organic substance in groundwater into the soil. The micro-bubbles are injected into the deeper side of the saturation zone of soil to accumulate volatile organic compounds in the deep groundwater. As the micro-bubbles slowly rise to the surface 6 of the groundwater, the inter-phase mass transfer of the pollutants is promoted. In an embodiment, the pulsed pumping is used to significantly improve the extraction efficiency and reduce the labor cost.

Referring to FIG. 1 to FIG. 4, an embodiment of a method for joint treatment of soil and groundwater is also provided by using the soil-groundwater joint remediation device, and the method includes the following steps:

injecting hot air into the injection well by the hot air injection member, injecting oxidant into the injection well by the oxidant injection member, and injecting micro-bubbles into the injection well by the micro-bubble injection member, under the control of the control structure;

extracting groundwater from the extraction well in a pulsed manner by the liquid phase extraction member, under the control of the control structure; and extracting gas from the extraction well by the gas phase extraction member, under the control of the control structure.

The liquid phase extraction member and the gas phase extraction member can extract volatile organic compounds in two different phases, the gas phase and the liquid phase, and significantly reduce the subsequent processing load.

In an embodiment, the step of extracting groundwater from the extraction well in a pulsed manner includes:

extracting groundwater from the extraction well while detecting the change in height of the surface 6 of the groundwater;

on a condition that the change in height of the surface 6 of groundwater within a first time period $t_1$ does not exceed a predetermined value $\Delta h$, extracting groundwater further for a second time period $t_2$ and then terminating the extracting of groundwater; and extracting groundwater again on a condition that the extracting of groundwater is terminated for a third time period $t_3$ or the surface 6 of groundwater has risen to a preset height.

The technical features of the above-described embodiments may be arbitrarily combined. In order to make the description simple, not all possible combinations of the technical features in the above embodiments are described. However, as long as there is no contradiction in the combination of these technical features, the combinations should be in the scope of the present disclosure.

What described above are only several implementations of the present disclosure, and these embodiments are specific and detailed, but not intended to limit the scope of the present disclosure. It should be understood by the skilled in the art that various modifications and improvements can be made without departing from the conception of the present disclosure, and all fall within the protection scope of the present disclosure. Therefore, the patent protection scope of the present disclosure is defined by the appended claims

What is claimed is:

1. A soil-groundwater joint remediation device, disposed in an area to be remediated, comprising:
    an injection structure disposed in an injection well defined in the area to be remediated, the injection structure comprising:
        a hot air injection member configured for injecting hot air into the injection well, the hot air injection member comprising a hot air injection screen, the hot air injection screen being above a surface of groundwater;
        an oxidant injection member configured for injecting an oxidant into the injection well; and
        a micro-bubble injection member configured for injecting micro-bubbles into the injection well;
    an extraction structure disposed in an extraction well defined in the area to be remediated and spaced from the injection structure, the extraction structure comprising:
        a liquid phase extraction member configured for extracting liquid from the extraction well;
        a gas phase extraction member configured for extracting gas from the extraction well; and
        an extraction well member and an extraction screen, wherein the extraction well member and the extraction screen are disposed in the extraction well, the extraction screen is disposed at a lower end of the extraction well member, the extraction screen is a tubular mesh structure extending from the surface of groundwater to a bottom of the extraction well, the liquid phase extraction member comprises:
        a water suction pump; and
        a water suction pipe, wherein the water suction pump is above the ground of the area to be remediated, the water suction pipe is connected to and in fluid communication with the water suction pump, and a lower end of the water suction pipe extends into the extraction well and below the surface of the groundwater;

a control structure respectively connected to the hot air injection member, the oxidant injection member, the micro-bubble injection member, the liquid phase extraction member, and the gas phase extraction member, controlling the liquid phase extraction member and the gas phase extraction member to perform an extraction operation.

2. The soil-groundwater joint remediation device of claim 1, wherein the control structure controls the liquid phase extraction member to extract groundwater in a pulsed manner.

3. The soil-groundwater joint remediation device of claim 1, wherein the hot air injection member further comprises:
a power source;
a hot air compressor connected to the power source;
a hot air injection pipe connected to and fluid communicated with the hot air compressor at one end; and
a hot air injection well member disposed in the injection well, the hot air injection pipe being connected to and fluid communicated with the hot air injection well member at another end;
wherein the hot air injection screen is disposed at a lower end of the hot air injection well member.

4. The soil-groundwater joint remediation device of claim 3, further comprising:
a gravel layer disposed in the injection well, around the hot air injection screen;
cement layers disposed in the injection well, around the hot air injection well member and below a bottom of the hot air injection screen; and
two bentonite layers disposed in the injection well, adjacent to the hot air injection screen and sandwiching the gravel layer.

5. The soil-groundwater joint remediation device of claim 1, wherein the oxidant injection member comprises:
an oxidant tank;
an oxidant injection pipe connected to and fluid communicated with the oxidant tank at one end;
an oxidant injection well member disposed in the injection well, the oxidant injection pipe being connected to and fluid communicated with the oxidant injection well member at another end; and
an oxidant injection screen disposed at a lower end of the oxidant injection well member;
wherein the oxidant injection screen is below the surface of groundwater.

6. The soil-groundwater joint remediation device of claim 5, further comprising:
a gravel layer disposed in the injection well, around the oxidant injection screen;
cement layers disposed in the injection well, around the oxidant injection well member and below a bottom of the oxidant injection screen; and
two bentonite layers disposed in the injection well, adjacent to the oxidant injection screen and sandwiching the gravel layer.

7. The soil-groundwater joint remediation device of claim 1, wherein the micro-bubble injection member comprises:
a blower;
a flow conduit connected to and fluid communicated with the blower at one end;
a micro-bubble generator, the flow conduit being connected to and fluid communicated with the micro-bubble generator at another end;
a micro-bubble injection well member disposed in the injection well; and
a micro-bubble injection screen disposed at a lower end of the micro-bubble injection well member;
wherein the micro-bubble injection screen is below the surface of groundwater, and the micro-bubble generator is located at the bottom of the micro-bubble injection well member, corresponding to the micro-bubbles injection screen.

8. The soil-groundwater joint remediation device of claim 7, further comprising:
a gravel layer disposed in the injection well, around the micro-bubble injection screen;
a cement layer disposed in the injection well, around the micro-bubble injection well member; and
two bentonite layers disposed in the injection well, adjacent to the micro-bubble injection screen and sandwiching the gravel layer.

9. The soil-groundwater joint remediation device of claim 1, wherein the gas phase extraction member comprises:
an air suction pump; and
an air suction pipe;
wherein the air suction pump is disposed above a ground of the area to be remediated; the air suction pipe is connected to and in fluid communication with the air suction pump, and an end of the air suction pipe is located above the surface of groundwater and in fluid communication with the extraction well member.

10. The soil-groundwater joint remediation device of claim 1, further comprising:
a gravel layer disposed in the extraction well, around the extraction screen;
a cement layer disposed in the extraction well, around the extraction well member; and
a bentonite layer disposed in the extraction well, adjacent to the extraction screen and located between the cement layer and the gravel layer.

11. The soil-groundwater joint remediation device of claim 10, wherein a top of the fourth gravel layer is located above the surface of groundwater.

12. The soil-groundwater joint remediation device of claim 1, wherein the control structure comprises:
a controller;
a control switch;
a data converter; and
a level gauge;
wherein the level gauge is configured for detecting a water level change of groundwater in the extraction well member; the data converter is connected to the controller and the level gauge, and the water level change data detected by the level gauge is transmitted to the controller through the data converter; the control switch is disposed on the water suction pipe and connects to the controller, and the controller controls on and off of the control switch according to the water level change of the groundwater.

13. The soil-groundwater joint remediation device of claim 1, wherein a plurality of injection wells and a plurality of extraction wells are defined in the area to be remediated and arranged in rows and columns to form an array, the number of the injection structure and the number of the extraction structure are both plural, corresponding to the injection wells and the extraction wells; each two adjacent extraction structures are separated by one injection structure located therebetween, each two adjacent injection structures are separated by one extraction structure located therebetween.

14. A method for joint treatment of soil and groundwater by using the soil-groundwater joint remediation device of claim 1, comprising:
   injecting hot air into the injection well by the hot air injection member, injecting oxidant into the injection well by the oxidant injection member, and injecting micro-bubbles into the injection well by the micro-bubble injection member, under the control of the control structure;
   extracting groundwater from the extraction well in a pulsed manner by the liquid phase extraction member, under the control of the control structure; and
   extracting gas from the extraction well by the gas phase extraction member, under the control of the control structure.

15. The method of claim 14, wherein the extracting groundwater from the extraction well in a pulsed manner comprising:
   extracting groundwater from the extraction well while detecting the change in height of the surface of groundwater;
   on a condition that the change in height of the surface of groundwater within a first time period $t_1$ does not exceed a predetermined value $\Delta h$, extracting groundwater further for a second time period $t_2$ and then terminating the extracting of groundwater; and
   extracting groundwater again on a condition that the extracting of groundwater is terminated for a third time period $t_3$ or the surface of groundwater has risen to a preset height.

16. A soil-groundwater joint remediation device, disposed in an area to be remediated, comprising:
   an injection structure disposed in an injection well defined in the area to be remediated, the injection structure comprising:
      a hot air injection member configured for injecting hot air into the injection well, the hot air injection member comprising a hot air injection screen, the hot air injection screen being above a surface of groundwater;
      an oxidant injection member configured for injecting an oxidant into the injection well; and
      a micro-bubble injection member configured for injecting micro-bubbles into the injection well;
   an extraction structure disposed in an extraction well defined in the area to be remediated and spaced from the injection structure, the extraction structure comprising:
      a liquid phase extraction member configured for extracting liquid from the extraction well;
      a gas phase extraction member configured for extracting gas from the extraction well;
      an extraction well member; and
      an extraction screen, the extraction well member and the extraction screen being disposed in the extraction well, the extraction screen being disposed at a lower end of the extraction well member, the extraction screen being a tubular mesh structure extending from the surface of groundwater to the bottom of the extraction well;
   a control structure respectively connected to the hot air injection member, the oxidant injection member, the micro-bubble injection member, the liquid phase extraction member, and the gas phase extraction member, controlling the liquid phase extraction member and the gas phase extraction member to perform an extraction operation;
   a gravel layer disposed in the injection well, around the hot air injection screen;
   cement layers disposed in the injection well, around the hot air injection well member and below a bottom of the hot air injection screen; and
   two bentonite layers disposed in the injection well, adjacent to the hot air injection screen and sandwiching the gravel layer.

* * * * *